(12) United States Patent
Katayama

(10) Patent No.: US 12,241,042 B2
(45) Date of Patent: Mar. 4, 2025

(54) CLEANING LIQUID AND INKJET RECORDING APPARATUS LIQUID SET

(71) Applicant: KYOCERA Document Solutions Inc., Osaka (JP)

(72) Inventor: Yosuke Katayama, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 149 days.

(21) Appl. No.: 18/172,937

(22) Filed: Feb. 22, 2023

(65) Prior Publication Data

US 2023/0272305 A1    Aug. 31, 2023

(30) Foreign Application Priority Data

Feb. 28, 2022 (JP) ................. 2022-029408

(51) Int. Cl.
| | |
|---|---|
| C09D 11/322 | (2014.01) |
| B41J 2/165 | (2006.01) |
| C09D 11/38 | (2014.01) |
| C09D 11/40 | (2014.01) |
| C09D 11/54 | (2014.01) |
| C11D 1/00 | (2006.01) |
| C11D 1/72 | (2006.01) |
| C11D 3/16 | (2006.01) |
| C11D 3/20 | (2006.01) |
| C11D 3/37 | (2006.01) |
| C11D 17/00 | (2006.01) |

(52) U.S. Cl.
CPC ............ *C11D 1/72* (2013.01); *B41J 2/16552* (2013.01); *C09D 11/322* (2013.01); *C09D 11/38* (2013.01); *C09D 11/40* (2013.01); *C09D 11/54* (2013.01); *C11D 1/008* (2013.01); *C11D 3/164* (2013.01); *C11D 3/2041* (2013.01); *C11D 3/2065* (2013.01); *C11D 3/3707* (2013.01); *C11D 17/0008* (2013.01)

(58) Field of Classification Search
CPC ......... C11D 1/72; C11D 3/164; C11D 3/2065; C11D 1/008; C11D 3/2041; C11D 3/3707; C11D 17/0008; B41J 2/16552; C09D 11/322; C09D 11/38; C09D 11/54; C09D 11/40
See application file for complete search history.

(56) References Cited

U.S. PATENT DOCUMENTS

| | | | |
|---|---|---|---|
| 7,695,099 B2 | 4/2010 | Sanada et al. | |
| 7,814,918 B2 | 10/2010 | Nagai et al. | |
| 8,157,349 B2 | 4/2012 | Sanada et al. | |
| 2007/0247484 A1 | 10/2007 | Sanada et al. | |
| 2007/0252868 A1 | 11/2007 | Sanada et al. | |
| 2008/0127573 A1* | 6/2008 | Roh | C09K 3/1463 |
| | | | 51/293 |
| 2008/0283092 A1 | 11/2008 | Nagai et al. | |
| 2009/0145640 A1* | 6/2009 | Toyoda | H05K 3/125 |
| | | | 428/210 |
| 2019/0025703 A1* | 1/2019 | Shimizu | B65D 25/14 |

FOREIGN PATENT DOCUMENTS

| | | | |
|---|---|---|---|
| JP | 2006-205713 A | 8/2006 | |
| JP | 2016216542 A * | 12/2016 | ............ C09D 7/50 |

* cited by examiner

*Primary Examiner* — Yaovi M Ameh
(74) *Attorney, Agent, or Firm* — Studebaker & Brackett PC

(57) ABSTRACT

A cleaning liquid contains water, a specific organic solvent, and an acetylene surfactant. The specific organic solvent is at least one selected from the group consisting of polyhydric alcohol and polyalkylene glycol. The specific organic solvent has a percentage content of at least 1% by mass and no greater than 18% by mas to the mass of the cleaning liquid. The acetylene surfactant has a percentage content of at least 0.3% by mass and no greater than 1.0% by mass to the mass of the cleaning liquid.

8 Claims, No Drawings

CLEANING LIQUID AND INKJET RECORDING APPARATUS LIQUID SET

INCORPORATION BY REFERENCE

The present application claims priority under 35 U.S.C. § 119 to Japanese Patent Application No. 2022-029408, filed on Feb. 28, 2022. The contents of this application are incorporated herein by reference in their entirety.

BACKGROUND

The present disclosure relates to a cleaning liquid and an inkjet recording apparatus liquid set.

Ejection of ink from a recording head included in an inkjet recording apparatus prints an image on a recording medium. Various cleaning liquids are being studied for cleaning ink attached to an ejection surface of the recording head. For example, a liquid for head cleaning is known that contains glycerin and water at a mass ratio in a range from 75:25 to 95:5.

SUMMARY

A cleaning liquid according to an aspect of the present disclosure contains water, a specific organic solvent, and an acetylene surfactant. The specific organic solvent is at least one selected from the group consisting of polyhydric alcohol and polyalkylene glycol. The specific organic solvent has a percentage content of at least 1% by mass and no greater than 18% by mass to mass of the cleaning liquid. The acetylene surfactant has a percentage content of at least 0.3% by mass and no greater than 1.0% by mass to the mass of the cleaning liquid.

An inkjet recording apparatus liquid set according to an aspect of the present disclosure includes a first liquid and a second liquid. The first liquid is an ink while the second liquid is a cleaning liquid. The cleaning liquid contains water, a specific organic solvent, and an acetylene surfactant. The specific organic solvent is at least one selected from the group consisting of polyhydric alcohol and polyalkylene glycol. The specific organic solvent has a percentage content of at least 1% by mass and no greater than 18% by mass to mass of the cleaning liquid. The acetylene surfactant has a percentage content of at least 0.3% by mass and no greater than 1.0% by mass to the mass of the cleaning liquid.

DETAILED DESCRIPTION

The following describes embodiments of the present disclosure. The terms used in the present specification will be described first. A measurement value for volume median diameter ($D_{50}$) refers to a median diameter as measured using a laser diffraction particle size distribution analyzer ("ZETASIZER NANO ZS", product of Sysmex Corporation) unless otherwise specified. A measurement value for average molecular weight refers to a value as measured using gel permeation chromatography unless otherwise specified. An HLB value refers to a value as calculated using a formula "HLB value=20×(sum of formula weight of hydrophilic part)/molecular weight" according to the Griffin method unless otherwise specified. Words "independently of each other" in the formula description mean possibly representing the same group or different groups. Each of the components described in the present specification may be used independently as one type or in combination of two or more types. The terms used in the present specification have been described so far.

First Embodiment: Cleaning Liquid

The following describes a cleaning liquid according to a first embodiment of the present disclosure. The cleaning liquid of the first embodiment is a cleaning liquid for an inkjet recording apparatus, and is an aqueous cleaning liquid containing water. The cleaning liquid of the first embodiment contains water, a specific organic solvent, and an acetylene surfactant. In the following, an "acetylene surfactant contained in the cleaning liquid" may be referred to as "acetylene surfactant C".

Here, an ejection surface of a recording head of the inkjet recording apparatus is configured with nozzle orifices from which ink is ejected toward a recording medium. In general, a water-repellent finish is applied to the ejection surface. However, since the nozzle orifices are openings in a plate subjected to water-repellent finish, there are areas on the inner surface of each nozzle orifice and on proximate area to the nozzle orifice on the ejection surface where water-repellent finish is insufficient. In the following, the "inner surface of each nozzle orifice and the proximate area to the nozzle orifice on the ejection surface" may be referred to as "nozzle inner surface and proximate area surface", respectively. When ink is not ejected for an extended period, the ink may dry and stick to the nozzle inner surface and the proximate area surface. In the following, "dried ink in the nozzle inner surface and the proximate area surface" may be referred to as "dried ink". The dried ink can cause nozzle clogging and a decrease in accuracy of ink placement, for example.

Reasons why the cleaning liquid of the first embodiment can favorably clean the dried ink will be described first. The specific organic solvent in the cleaning liquid of the first embodiment is at least one selected from the group consisting of polyhydric alcohol and polyalkylene glycol. The specific organic solvent has a percentage content of at least 1% by mass and no greater than 18% by mass to the mass of the cleaning liquid. The acetylene surfactant C has a percentage content of at least 0.3% by mass and no greater than 1.0% by mass to the mass of the cleaning liquid. With the above features, a later-described SUS-cleaning liquid contact angle θc tends to be no greater than a desired value. Accordingly, the cleaning liquid readily wets the nozzle inner surface and the proximate area surface (e.g., the nozzle inner surface and the proximate area surface that are made from austenitic stainless steel). As such, the cleaning liquid can easily enter gaps between the dried ink and the nozzle inner surface or the proximate area surface. As a result, the dried ink is favorably cleaned.

As described previously, the cleaning liquid according to the first embodiment easily enter the gaps between the dried ink and the nozzle inner surface or the proximate area surface. As such, the cleaning liquid of the first embodiment generally swells and dissolve a portion of the dried ink (specifically, a portion of the dried ink near the interface of the dried ink and the nozzle inner surface or the proximate area surface). Thereafter, the dried ink is easily removed from the nozzle inner surface and the proximate area surface before the dried ink is completely dissolved. It is sufficient if only a portion, but not all, of the dried ink is dissolved. As such, the time required to dissolve the dried ink is shortened, enabling cleaning of the nozzle inner surface and the proximate area surface in a short time.

Dried ink tends to be produced particularly in a situation in which an ink excellent in adhesion to a non-absorbent recording medium or a low-absorbent recording medium is used. In the following, "non-absorbent recording medium" and "low-absorbent recording medium" may be referred to as "specific recording medium". This is because such an ink contains a relatively large amount of resin (e.g., either or both a pigment dispersion resin and a binder resin). Due to having excellent cleanability as described above, the cleaning liquid of the first embodiment is effective in cleaning of an ink excellent in adhesion to the specific recording medium. Note that the cleaning liquid of the first embodiment may not contain a large amount of a hydrophobic organic solvent because of having such excellent cleanability. If the amount of the hydrophobic organic solvent contained in the cleaning liquid is small or if the cleaning liquid contains no hydrophobic organic solvent, defects are hardly caused in resin members included in the inkjet recording apparatus.

The reasons why the cleaning liquid of the first embodiment can favorably clean the dried ink have been described so far. However, the cleaning liquid of the first embodiment can favorably clean not only the dried ink but also yet dried ink for the following reasons. As described previously, the cleaning liquid of the first embodiment readily wets the nozzle inner surface and the proximate area surface due to having a later-described SUS-cleaning liquid contact angle $\theta c$ of no greater than the desired value. As such, the cleaning liquid easily enters the gaps between the yet dried ink and the nozzle inner surface or the proximate area surface even before the ink dries. Furthermore, due to not adhering to the ejection surface, the yet dried ink can be cleaned more easily than the dried ink. Therefore, the cleaning liquid of the first embodiment is effective in cleaning of the yet dried ink.

(SUS-Cleaning Liquid Contact Angle $\theta$)

The cleaning liquid preferably has a contact angle $\theta c$ with respect to an austenitic stainless steel plate of no greater than 80 degrees. In the following, the "contact angle $\theta c$ with respect to an austenitic stainless steel plate" may be referred to as "SUS-cleaning liquid contact angle $\theta c$". As a result of the SUS-cleaning liquid contact angle $\theta c$ being no greater than 80 degrees, the cleaning liquid easily wets the nozzle inner surface and the proximate area surface. Accordingly, the cleaning liquid easily enter the gaps between ink and the nozzle inner surface or the proximate area surface to favorably clean the ink. In order to favorably clean the ink, the SUS-cleaning liquid contact angle $\theta c$ is more preferably no greater than 75 degrees, and further preferably no greater than 70 degrees. The lower limit of the SUS-cleaning liquid contact angle $\theta c$ is not particularly limited, but may be at least 60 degrees, for example.

In the present specification, the "austenitic stainless steel" means "SUS304" as defined in the Japanese Industrial Standards (JIS) G 4305:2012 "Cold-rolled stainless steel plate, sheet and strip". In the following, the "austenitic stainless steel" may be referred to as "SUS304". In a case in which the material of the ejection surface of the recording head included in the inkjet recording apparatus is SUS304, for example, the SUS-cleaning liquid contact angle $\theta c$ corresponds to the contact angle of the cleaning liquid to the ejection surface (particularly, the nozzle inner surface and proximate area surface).

The SUS-cleaning liquid contact angle $\theta c$ can be adjusted by changing the percentage content of the acetylene surfactant C and the percentage content of the specific organic solvent, for example. The SUS-cleaning liquid contact angle $\theta c$ is measured using a contact angle measuring device. A detailed measurement method of the SUS-cleaning liquid contact angle $\theta c$ will be described later in Examples.

(Acetylene Surfactant C)

The acetylene surfactant C tends to reduce the SUS-cleaning liquid contact angle $\theta c$ to the desired value compared to any other surfactants (e.g., an acrylic polymer surfactant). Therefore, the cleaning liquid containing the acetylene surfactant C reduces the SUS-cleaning liquid contact angle $\theta c$ to the desired value to readily wet the nozzle inner surface and the proximate area surface.

As described previously, the acetylene surfactant C has a percentage content of at least 0.3% by mass and no greater than 1.0% by mass to the mass of the cleaning liquid. As a result of the percentage content of the acetylene surfactant C being set to at least 0.3% by mass to the mass of the cleaning liquid, the SUS-cleaning liquid contact angle $\theta c$ reduces to the desired value, thereby making it easy for the cleaning liquid to wet the nozzle inner surface and the proximate area surface. As a result, the cleaning liquid easily enter the gaps between the ink and the nozzle inner surface or the proximate area surface to favorably clean ink. As a result of the percentage content of the acetylene surfactant C being set to no greater than 1.0% by mass to the mass of the cleaning liquid by contrast, the acetylene surfactant C is sufficiently mixed with the water and the specific organic solvent without phase separation.

In the present specification, the acetylene surfactant means a surfactant with an acetylene bond (carbon-atom triple bond). The acetylene surfactant C is preferably a surfactant having a moiety represented by formula (1). In formula (1), $R^1$ represents a group including a hydroxy group and * represents a bond.

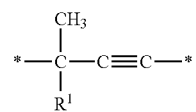

(1)

The bond represented by * in formula (1) is bonded to an atom (e.g., a hydrogen atom or a carbon atom) constituting the acetylene surfactant C.

Examples of the group including a hydroxy group that is represented by $R^1$ in formula (1) include a hydroxy group and a group with ethylene oxide added thereto. The group with ethylene oxide added thereto is preferably a group represented by formula (2). In formula (2), m represents the number of moles of ethylene oxide added. m is an integer of at least 1, for example. In formula (2), * represents a bond, and this bond is bonded to the carbon atom to which $R^1$ in formula (1) is bonded.

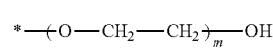

(2)

Examples of the acetylene surfactant C include acetylene alcohol, acetylene glycol, and an ethylene oxide adduct of acetylene glycol. Acetylene alcohol preferably have a moiety represented by formula (1A). Acetylene glycol preferably have a moiety represented by formula (1B). The ethylene oxide adduct of acetylene glycol is preferably a compound represented by formula (1C).

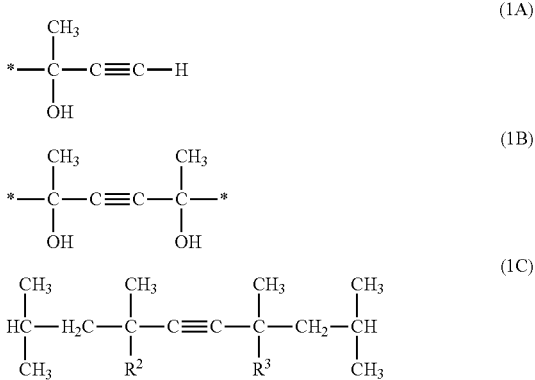

In formulas (1A) and (1B), * represents a bond that is bonded to a carbon atom constituting the acetylene surfactant C. $R^2$ and $R^3$ in formula (1C) each represent the previously described group with ethylene oxide added thereto.

Preferably, the acetylene surfactant C is a nonionic surfactant. The acetylene surfactant C preferably has an HLB value of at least 3 and no greater than 20, and more preferably at least 8 and no greater than 18. Alternatively, the acetylene surfactant C may have an HLB value of at least 8 and no greater than 10, at least 12 and no greater than 14, or at least 16 and no greater than 18.

The cleaning liquid may further contain a surfactant other than the acetylene surfactant C. Examples of the surfactant other than the acetylene surfactant C are the same as those listed as examples of a surfactant I described later in a second embodiment. However, in order to favorably clean the ink, the percentage content of the acetylene surfactant C is preferably at least 90% by mass to the total mass of the surfactant(s) contained in the cleaning liquid, more preferably at least 95% by mass, and particularly preferably 100% by mass. That is, the cleaning liquid particularly preferably contains only the acetylene surfactant C as the surfactant.

(Specific Organic Solvent)

The specific organic solvent is at least one selected from the group consisting of polyhydric alcohol and polyalkylene glycol. The specific organic solvent is a water-soluble organic solvent. As a result of the cleaning liquid containing the specific organic solvent, the acetylene surfactant C favorably moves toward the air-liquid interface between air and the cleaning liquid. This makes it easy to reduce the SUS-cleaning liquid contact angle θc to the desired value.

Examples of the polyhydric alcohol include divalent and trivalent alcohols. The divalent and trivalent alcohols preferably have a carbon number of at least 1 and no greater than 8. Examples of the divalent and trivalent alcohols include glycerin, ethylene glycol, 1,2-propanediol (also called propylene glycol), 1,3-propanediol, 1,2-pentanediol, 1,5-pentanediol, 1,2-octanediol, 1,8-octanediol, 3-methyl-1,3-butanediol, 3-methyl-1,5-pentanediol, diethylene glycol, triethylene glycol, and tetraethylene glycol.

Examples of the polyalkylene glycol include polyethylene glycol and polypropylene alcohol.

The specific organic solvent is preferably at least one and no greater than three selected from the group consisting of polyhydric alcohol and polyalkylene glycol, and more preferably one selected from the group consisting thereof. The specific organic solvent is preferably at least one selected from the group consisting of glycerin, propylene glycol, and polyethylene glycol, and more preferably one selected from the group consisting thereof.

As described previously, the percentage content of the specific organic solvent is at least 1% by mass and no greater than 18% by mass to the mass of the cleaning liquid. As a result of the percentage content of the specific organic solvent being set to at least 1% by mass to the mass of the cleaning liquid, the SUS-cleaning liquid contact angle θc reduces to the desired value, thereby making the cleaning liquid readily wet the nozzle inner surface and the proximate area surface. As a result, the cleaning liquid easily enter the gaps between the ink and the nozzle inner surface or the proximate area surface to favorably clean ink. As a result of the percentage content of the specific organic solvent being set to no greater than 18% by mass to the mass of the cleaning liquid by contrast, the acetylene surfactant C is sufficiently mixed with water and the specific organic solvent without phase separation. The percentage content of the specific organic solvent is preferably at least 5% by mass to the mass of the cleaning liquid, and more preferably at least 10% by mass. The percentage content of the specific organic solvent is preferably no greater than 16% by mass to the mass of the cleaning liquid, more preferably no greater than 15% by mass, and further preferably no greater than 14% by mass.

In the cleaning liquid, a ratio Ms/(Mw+Ms) of a mass Ms of the specific organic solvent to the total of a mass Mw of the water and the mass Ms of the specific organic solvent is preferably at least 0.01 and no greater than 0.45, more preferably at least 0.05 and no greater than 0.30, and further preferably at least 0.10 and no greater than 0.15.

(Different Water-Soluble Organic Solvent C)

The cleaning liquid may further contain a water-soluble organic solvent other than the specific organic solvent as necessary. In the following, a "water-soluble organic solvent contained in the cleaning liquid other than the specific organic solvent" may be referred to as "different water-soluble organic solvent C".

Examples of the different water-soluble organic solvent C include glycol ethers, lactam compounds, nitrogen-containing compounds, acetate compounds, and dimethyl sulfoxide.

Examples of the glycol ethers include diethylene glycol diethyl ether, diethylene glycol monobutyl ether, ethylene glycol monomethyl ether, ethylene glycol monobutyl ether, diethylene glycol monomethyl ether, diethylene glycol monoethyl ether, diethylene glycol diethyl ether, triethylene glycol monomethyl ether, triethylene glycol monoethyl ether, triethylene glycol monobutyl ether, propylene glycol monomethyl ether, and dipropylene glycol monomethyl ether.

Examples of the lactam compounds include 2-pyrrolidone and N-methyl-2-pyrrolidone.

Examples of the nitrogen-containing compounds include 1,3-dimethylimidazolidinone, formamide, and dimethyl formamide.

Examples of the acetate compounds include diethylene glycol monoethyl ether acetate.

However, in order to favorably clean the ink, the cleaning liquid preferably contains only the specific organic solvent as a water-soluble organic solvent. That is, the cleaning liquid may not contain the different water-soluble organic solvent C. For example, the cleaning liquid may not contain glycol ether.

(Water)

The water has a percentage content of preferably at least 80% by mass and no greater than 95% by mass to the mass of the cleaning liquid, and more preferably at least 80% by mass and no greater than 90% by mass.

(Other Component)

The cleaning liquid may further contain a known additive (specifically, any of a solution stabilizer, an anti-drying agent, an antioxidant, a viscosity modifier, a pH adjuster, and an antifungal agent) as necessary. The pH adjuster is preferably a basic compound, and more preferably sodium hydroxide. In a case in which the cleaning liquid contains a basic compound, the percentage content of the basic compound is preferably greater than 0.0% by mass and no greater than 1.0% by mass to the mass of the cleaning liquid in terms of percentage content of 1N aqueous solution of the basic compound.

(Cleaning Liquid Production Method)

The cleaning liquid of the first embodiment can be produced for example by mixing water, the specific organic solvent, the acetylene surfactant C, and a component added as necessary using a stirrer.

(Cleaning Method Using Cleaning Liquid)

As a result of the cleaning liquid of the first embodiment being supplied to the ejection surface of the recording head, the nozzle inner surface, the proximate area surface, and an area of the ejection surface other than the proximate area surface are cleaned. The cleaning liquid of the first embodiment is a one-pack cleaning liquid for cleaning using one cleaning liquid. Examples of a method for supplying the cleaning liquid to the ejection surface include supply of the cleaning liquid using sponge or a sheet impregnated with the cleaning liquid, ejection of the cleaning liquid by inkjetting, application of the cleaning liquid using a roller, and spray of the cleaning liquid. Supply of the cleaning liquid is preferably followed by wiping of the ejection surface using a wiping blade, for example. Note that the cleaning liquid of the first embodiment can be used for cleaning a member (e.g., a wiping blade or a conveyance roller) included in the inkjet recording apparatus other than the recording head.

Second Embodiment: Inkjet Recording Apparatus Liquid Set

The second embodiment of the present disclosure relates to an inkjet recording apparatus liquid set (also referred to below as liquid set). The liquid set of the second embodiment includes a first liquid and a second liquid. The first liquid is an ink. The second liquid is the cleaning liquid according to the first embodiment. The cleaning liquid and the ink are contained in different containers, for example.

<Ink>

The following describes the ink being the first liquid of the liquid set of the second embodiment.

<SUS-Ink Contact Angle θi>

The ink has a contact angle θi with respect to an SUS304 plate of preferably at least 75 degrees, more preferably at least 75 degrees and no greater than 100 degrees, further preferably at least 80 degrees and no greater than 100 degrees, and furthermore preferably at least 90 degrees and no greater than 100 degrees. In the following, the "contact angle θi of the ink with respect to the SUS304 plate" may be referred to as "SUS-ink contact angle θi". The SUS-ink contact angle θi is a contact angle of yet dried ink with respect to the SUS304 plate. When the SUS-ink contact angle θi is at least 75 degrees, the cleaning liquid tends to more easily wet the SUS304 plate than yet dried ink. Accordingly, the cleaning liquid easily enter the gaps between the ink and the nozzle inner surface or the proximate area surface to favorably clean the yet dried ink before the yet dried ink dries. Furthermore, when the SUS-ink contact angle θi is at least 75 degrees, the cleaning liquid easily enter the gap between the dried ink and the nozzle inner surface or the proximate area surface even after the ink dries, tending to favorably cleaning the dried ink. The upper limit of the SUS-ink contact angle θi is not particularly limited, and may be no greater than 100 degrees, for example. The SUS-ink contact angle θi is measured using a contact angle measuring device. A method for measuring the SUS-ink contact angle θi will be described later in detail in Examples.

<Contact Angle Difference θi−θc>

The SUS-ink contact angle θi and the SUS-cleaning liquid contact angle θc preferably satisfy the following numerical formula (A).

$$\theta i - \theta c \geq 10 \qquad (A)$$

In the following, a value calculated using the formula "(SUS-ink contact angle θi)−(SUS-cleaning liquid contact angle θc)" may be referred to as "contact angle difference θi−θc". When the contact angle difference θi−θc is at least 10 degrees, the SUS-cleaning liquid contact angle θc is smaller by 10 degrees or more than the SUS-ink contact angle θi. In this situation, the cleaning liquid is more easily wet the SUS304 plate than the ink. Accordingly, the cleaning liquid easily enter the gaps between the yet dried ink and the nozzle inner surface or the proximate area surface before the ink dries to favorably clean the yet dried ink. Furthermore, when the contact angle difference θi−θc is at least 10 degrees, the cleaning liquid easily enter the gap between the dried ink and the nozzle inner surface or the proximate area surface even after the ink dries, tending to favorably cleaning the dried ink. The contact angle difference θi−θc is preferably at least 15 degrees, and more preferably at least 20 degrees. The contact angle difference θi−θc is preferably no greater than 35 degrees, more preferably no greater than 30 degrees, and further preferably no greater than 25 degrees.

<Dried Ink-Cleaning Liquid Contact Angle θd>

The cleaning liquid preferably has a contact angle θd with respect to the dried ink of no greater than 15 degrees. In the following, the "contact angle θd of the cleaning liquid with respect to the dried ink" may be referred to as "dried ink-cleaning liquid contact angle θd". When the dried ink-cleaning liquid contact angle θd is no greater than 15 degrees, the cleaning liquid easily wet the dried ink. Accordingly, the cleaning liquid easily enter the gap between the dried ink and the nozzle inner surface or the proximate area surface without being repelled by the dried ink. As a result, the dried ink is favorably cleaned. In order to favorably clean the dried ink, the dried ink-cleaning liquid contact angle θd is preferably no greater than 10 degrees, and more preferably no greater than 7 degrees. In order to favorably clean the dried ink, the dried ink-cleaning liquid contact angle θd is more preferably at least 2 degrees.

The dried ink-cleaning liquid contact angle θd is measured by the following method. That is, the yet dried ink is spin-coated on an SUS304 plate so as to have a film thickness of 7 μm. Next, the ink on the SUS304 plate is dried at 60° C. until mass loss is no longer observed to obtain a sample plate. The sample plate is an SUS304 plate with film-like dried ink (a film of a solid content contained in the ink). Next, the cleaning liquid is dripped onto the dried ink on the sample plate and the dried ink-cleaning liquid contact angle θd is measured using a contact angle measuring device. The method for measuring the dried ink-cleaning liquid contact angle θd will be described later in detail in Examples.

<Ink Component>

The ink is a water-based ink containing water. The ink contains pigment particles and water, for example. The ink may contain a resin, a water-soluble organic solvent, and a surfactant added as necessary. Examples of the resin that may be contained in the ink include a pigment dispersion resin attached to the surfaces of the pigment particles and a binder resin in the form of emulsified particles. In the following, the "water-soluble organic solvent contained in the ink" and the "surfactant contained in the ink" may be referred to as "water-soluble organic solvent I" and "surfactant I", respectively.

(Pigment Particles)

Examples of the pigment usable as the pigment particles include yellow pigments, orange pigments, red pigments, blue pigments, violet pigments, and black pigments. Examples of the yellow pigments include C.I. Pigment Yellow 74, 93, 95, 109, 110, 120, 128, 138, 139, 151, 154, 155, 173, 180, 185, or 193. Examples of the orange pigments include C.I. Pigment Orange 34, 36, 43, 61, 63, or 71. Examples of the red pigments include C.I. Pigment Red 122 or 202. Quinacridone magenta (PR122) may be used as a red pigment. Examples of the blue pigments include C.I. Pigment Blue 15 or 15:3. Examples of the violet pigments include C.I. Pigment Violet 19, 23, or 33. Examples of the black pigments include C.I. Pigment Black 4 or 7. Carbon black may be used as a black pigment.

The pigment particles have a percentage content of at least 4% by mass and no greater than 12% by mass to the mass of the ink. As a result of the percentage content of the pigment particles being set to at least 4% by mass to the mass of the ink, images with desired image density can be easily obtained. As a result of the percentage content of the pigment particles being set to no greater than 12% by mass to the mass of the ink, fluidity of the ink can be sufficiently ensured. With the above also, images with desired image density can be easily obtained.

In order that the ink is excellent in color density and hue, the pigment particles have a volume median diameter ($D_{50}$) of preferably at least 30 nm and no greater than 200 nm, and more preferably at least 70 nm and no greater than 130 nm. In a case in which the pigment particles are covered with a later-described pigment dispersion resin, the volume median diameter ($D_{50}$) of the pigment particles covered with the pigment dispersion resin preferably falls in the above range.

(Pigment Dispersion Resin)

The pigment dispersion resin attaches to the surfaces of the pigment particles to disperse the pigment particles in the ink, for example. Note that a portion of the pigment dispersion resin may be free in the ink without attaching to the surfaces of the pigment particles. In order to sufficiently disperse the pigment particles in the ink, the pigment dispersion resin preferably cover the pigment particles.

Examples of the pigment dispersion resin include acrylic resin, styrene-acrylic resin, polyvinyl resin, polyester resin, amino resin, epoxy resin, urethane resin, polyether resin, polyamide resin, phenolic resin, silicone resin, fluororesin, styrene-maleic acid copolymers, styrene-maleic acid half ester copolymers, vinylnaphthalene-acrylic acid copolymers, and vinylnaphthalene-maleic acid copolymers.

Preferably, the pigment dispersion resin is anionic. In a case in which the pigment dispersion resin is anionic, the pigment dispersion resin may form a salt (e.g., sodium salt or potassium salt).

In order to obtain images with desired image density while inhibiting strike through in image formation, the mass of the pigment dispersion resin is preferably at least 15 parts by mass and no greater than 100 parts by mass relative to 100 parts by mass of the pigment particles. The pigment particles have a percentage content of at least 0.1 by mass and no greater than 3% by mass to the mass of the ink. As a result of the percentage content of the pigment dispersion resin being set to at least 0.1% by mass to the mass of the ink, the ink can have excellent preservation stability and ejection stability. As a result of the percentage content of the pigment dispersion resin being set to no greater than 3% by mass to the mass of the ink, void defect can be favorably inhibited in image formation.

(Binder Resin)

The binder resin is a resin different from the pigment dispersion resin. In a case in which the ink contains the binder resin, the binder resin is contained in the form of emulsified particles, for example. That is, emulsified particles constituted by the binder resin is dispersed in the ink.

Examples of the binder resin includes thermoplastic resins. Examples of the thermoplastic resins include urethane-acrylic resin, acrylic resin, styrene-acrylic resin, polyester resin, polyurethane, and polyolefin. Preferably, the binder resin is urethane-acrylic resin.

The binder resin preferably has a percentage content of at least 0.6% by mass and no greater than 1.8% by mass to the mass of the ink. As a result of the percentage content of the binder resin being set to no greater than 1.8% by mass to the mass of the ink, the ink can be favorably cleaned with the cleaning liquid. As a result of the percentage content of the binder resin being set to at least 0.6% by mass to the mass of the ink, the ink can be excellent in scratch resistance against a recording medium (particularly, the specific recording medium).

Note that examples of a low-absorbency recording medium as one type of the specific recording medium include art paper, coated paper, and cast-coated paper. Examples of a non-absorbent recording medium as one type of the specific recording medium include foil paper, synthetic paper, and plastic substrates. Examples of the plastic substrates include polyester (e.g., polyethylene terephthalate (PET)) substrates, polypropylene substrates, polystyrene substrates, and polyvinyl chloride substrates.

(Water)

In order that the ink has excellent ejection stability, the content of the water in the ink is preferably an amount that can bring sufficiently dissolution of the components of the water-soluble ink.

(Water-Soluble Organic Solvent I)

Examples of the water-soluble organic solvent I contained in the ink includes the solvent exemplified as the different water-soluble organic solvent C and the solvents exemplified as the specific organic solvent. Preferable examples of the water-soluble organic solvent I includes polyhydric alcohols, glycol ethers, and lactam compounds. Further preferable examples of the water-soluble organic solvent I include solvent mixtures of glycerin, triethylene glycol monobutyl ether, and 2-pyrrolidone.

In order that the ink has excellent ejection stability, the water-soluble organic solvent I has a percentage content of preferably at least 10% by mass and no greater than 65% by mass to the mass of the ink, and more preferably at least 30% by mass and no greater than 40% by mass. In a case in which two water-soluble organic solvents I are contained in the ink, the percentage content of the water-soluble organic solvent is the total percentage content of the two water-soluble organic solvents I.

(Surfactant I)

When the ink contains the surfactant I, the ink readily wets a recording medium. Examples of the surfactant I include anionic surfactants, cationic surfactants, and non-ionic surfactants. Preferably, the surfactant I is a nonionic surfactant. The surfactant I has an HLB value of preferably at least 3 and no greater than 20, and more preferably at least 4 and no greater than 8.

Preferably, the surfactant I is an acetylene surfactant or silicone surfactant.

Examples of the acetylene surfactant, which is usable as the surfactant I, are the same as those exemplified and listed previously as the acetylene surfactant C.

Description will be made of the silicon surfactant, which is usable as the surfactant I. In the present specification, the silicone surfactant means a surfactant with a siloxane bond. The silicone surfactant is preferably polyether-modified silicone, and more preferably polyether-modified polydimethylsiloxane. The polyether-modified polydimethylsiloxane preferably includes a repeating unit represented by formula (3), and further preferably includes a repeating unit represented by formula (3) and a terminal group represented by formula (4).

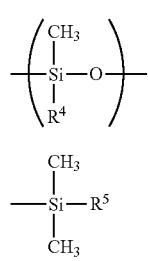

$R^4$ in formula (3) and $R^5$ in formula (4) each represent, independently of one another, a methyl group or polyether group. However, at least one of $R^4$ and $R^5$ represents a polyether group. The polyether group is a group having both —$C_2H_4O$— and —$C_3H_6O$—.

(Other Component)

The ink may further contain a known additive (e.g., any of a solution stabilizer, an anti-drying agent, an antioxidant, a viscosity modifier, a pH adjuster, and an antifungal agent) as necessary.

(Ink Production Method)

A method for producing the ink includes preparing the pigment dispersion and mixing the pigment dispersion and any other ink components.

In the preparing the pigment dispersion, the pigment particles, water, and components (specifically, the pigment dispersion resin and the binder resin, for example) added as necessary are mixed using a disperser (e.g., a media type disperser) to obtain the pigment dispersion.

In the mixing, the pigment dispersion and other ink components (specifically, the binder resin, water, the water-soluble organic solvent I, and the surfactant I, for example) are mixed to obtain the ink. The ink being the first liquid of the liquid set according to the second embodiment has been described so far.

Examples

The following describes examples of the present disclosure. In the following, "water" means "ion exchange water".

[Cleaning Liquid Preparation]

Cleaning liquids of Examples (C-1) to (C-9) and cleaning liquids of Comparative Examples (C-10B) to (C-15B) were prepared. Tables 1 and 2 show the components contained in the cleaning liquids and the amounts thereof.

TABLE 1

| | | Amount [part] | | | | | | | | |
|---|---|---|---|---|---|---|---|---|---|---|
| Cleaning liquid | | C-1 | C-2 | C-3 | C-4 | C-5 | C-6 | C-7 | C-8 | C-9 |
| Glycerin | | 10.0 | 10.0 | 10.0 | — | — | 10.0 | 10.0 | 15.0 | 10.0 |
| PG | | — | — | — | 10.0 | — | — | — | — | — |
| PEG | | — | — | — | — | 10.0 | — | — | — | — |
| TEGBE | | — | — | — | — | — | — | — | — | — |
| Water | | Rest | Rest | Rest | Rest | Rest | Rest | Rest | Rest | Rest |
| Surfactant A1 | Amount | 1.0 | — | — | 1.0 | 1.0 | — | — | 1.0 | 0.5 |
| | Active component amount | 0.6 | — | — | 0.6 | 0.6 | — | — | 0.6 | 0.3 |
| Surfactant A2 | Amount | — | 1.0 | — | — | — | — | — | — | — |
| | Active component amount | — | 1.0 | — | — | — | — | — | — | — |
| Surfactant A3 | Amount | — | — | 1.0 | — | — | — | — | — | — |
| | Active component amount | — | — | 0.8 | — | — | — | — | — | — |
| Surfactant A4 | Amount | — | — | — | — | — | 1.0 | — | — | — |
| | Active component amount | — | — | — | — | — | 1.0 | — | — | — |
| Surfactant A5 | Amount | — | — | — | — | — | — | 1.0 | — | — |
| | Active component amount | — | — | — | — | — | — | 1.0 | — | — |
| Surfactant A6-B | Amount | — | — | — | — | — | — | — | — | — |
| | Active component amount | — | — | — | — | — | — | — | — | — |
| NaOH | | 0.1 | 0.1 | 0.1 | 0.1 | 0.1 | 0.1 | 0.1 | 0.1 | 0.1 |
| Total | | 100.0 | 100.0 | 100.0 | 100.0 | 100.0 | 100.0 | 100.0 | 100.0 | 100.0 |

TABLE 2

| Cleaning liquid | | C-10B | C-11B | C-12B | C-13B | C-14B | C-15B |
|---|---|---|---|---|---|---|---|
| | Glycerin | 20.0 | 10.0 | 10.0 | 10.0 | — | 10.0 |
| | PG | — | — | — | — | — | — |
| | PEG | — | — | — | — | — | — |
| | TEGBE | — | — | — | — | 10.0 | — |
| | Water | Rest | Rest | Rest | Rest | Rest | Rest |
| Surfactant A1 | Amount | 1.0 | 0.1 | 3.0 | — | 1.0 | — |
| | Active component amount | 0.6 | 0.06 | 1.8 | — | 0.6 | — |
| Surfactant A2 | Amount | — | — | — | — | — | — |
| | Active component amount | — | — | — | — | — | — |
| Surfactant A3 | Amount | — | — | — | — | — | — |
| | Active component amount | — | — | — | — | — | — |
| Surfactant A4 | Amount | — | — | — | — | — | — |
| | Active component amount | — | — | — | — | — | — |
| Surfactant A5 | Amount | — | — | — | — | — | — |
| | Active component amount | — | — | — | — | — | — |
| Surfactant A6-B | Amount | — | — | — | 1.0 | — | — |
| | Active component amount | — | — | — | 0.6 | — | — |
| | NaOH | 0.1 | 0.1 | 0.1 | 0.1 | 0.1 | 0.1 |
| | Total | 100.0 | 100.0 | 100.0 | 100.0 | 100.0 | 100.0 |

The terms used in Tables 1 and 2 mean as follows.
Part: parts by mass
PG: propylene glycol
PEG: PEG200 (polyethylene glycol with an average molecular weight of 200)
TEGBE: triethylene glycol monobutyl ether
Surfactant A1: acetylene surfactant ("OLFINE (registered Japanese trademark) EXP4300", product of Nissin Chemical Industry Co., Ltd., ionicity: nonionic, active component concentration: 60% by mass, solvent: propylene glycol and dipropylene glycol)
Surfactant A2: acetylene surfactant ("OLFINE (registered Japanese trademark) E1010", product of Nissin Chemical Industry Co., Ltd., ionicity: nonionic, HLB value: 13.5, active component concentration: 100% by mass)
Surfactant A3: acetylene surfactant ("OLFINE (registered Japanese trademark) EXP4001", product of Nissin Chemical Industry Co., Ltd., ionicity: nonionic, HLB value: 9.5, active component concentration: 80% by mass, solvent: propylene glycol and water)
Surfactant A4: acetylene surfactant ("SURFYNOL (registered Japanese trademark) 465", product of Nissin Chemical Industry Co., Ltd., content: ethylene oxide adduct of acetylene glycol, ionicity: nonionic, HLB value: 13, active component concentration: 100% by mass)
Surfactant A5: acetylene surfactant ("SURFYNOL (registered Japanese trademark) 485", product of Nissin Chemical Industry Co., Ltd., content: ethylene oxide adduct of acetylene glycol, ionicity: nonionic, HLB value: 17, active component concentration: 100% by mass)
Surfactant A6-B: acrylic surfactant ("POLYFLOW KL-850", product of Kyoeisha Chemical Co., Ltd., content: acrylic polymer, ionicity: nonionic, active component concentration: 60% by mass, solvent: 2-hexanol)
NaOH: 1N aqueous solution of sodium hydroxide
Active component amount: substantial amount of surfactant. The active component amounts were calculated using an expression "active component amount (unit: parts by mass)=amount (unit: parts by mass) of surfactant added×active component concentration (unit: % by mass) of surfactant".
Rest: amount that makes the total mass of the components contained in a corresponding cleaning liquid 100.0 parts by mass. For example, the rest of the cleaning liquid (C-1) was 88.9 parts by mass (=100.0−(10.0+1.0+0.1)).
-: no corresponding component contained.

<Preparation of Cleaning Liquid (C-1)>
The components shown in the column titled "Cleaning liquid (C-1)" in Table 1 were stirred using a stirrer ("THREE-ONE MOTOR BL-600", product of Shinto Scientific Co., Ltd.). Thus, a cleaning liquid (C-1) was obtained.

<Preparation of Cleaning Liquids (C-2) to (C-9) and (C-10B) to (C-15B)>
Cleaning liquids (C-2) to (C-9) and (C-10B) to (C-15B) were prepared according to the same method as that for preparing the cleaning liquid (C-1) in all aspects other than that the components shown in the columns for the respective cleaning liquids in Tables 1 and 2 were stirred.

[Ink Preparation]
Inks (I-1) and (I-2) were prepared for liquid set use. Table 3 shows the components contained in the respective inks and the amounts thereof.

TABLE 3

| | Amount [part] | |
|---|---|---|
| Ink | I-1 | I-2 |
| Pigment dispersion | 40.0 | 40.0 |
| Binder | 3.0 | 3.0 |
| Water | Rest | Rest |
| Glycerin | 10.0 | 10.0 |
| TEGBE | 20.0 | 20.0 |
| Pyrrolidone | 5.0 | 5.0 |
| Surfactant B1 | 2.5 | — |
| Surfactant B2 | — | 2.5 |
| Total | 100.0 | 100.0 |

The terms used in Table 3 mean as follows.
Part: parts by mass
Pigment dispersion: "EMACOL SF BLACK AH2186F" (product of SANYO COLOR WORKS, Ltd., pigment: C.I. Pigment Black 7, dispersion medium: water, pigment concentration: 20% by mass)

Binder: "MOWINYL 6763" (product of Japan Coating Resin Corporation, binder particle dispersion containing urethane-acrylic resin, solid concentration: 40% by mass)

TEGBE: triethylene glycol monobutyl ether

Pyrrolidone: 2-pyrrolidone

Surfactant B1: acetylene surfactant ("SURFYNOL (registered Japanese trademark) 440", product of Nissin Chemical Industry Co., Ltd., content: ethylene oxide adduct of acetylene glycol, ionicity: nonionic, HLB value: 8, active component concentration; 100% by mass)

Surfactant B2: acetylene surfactant ("SURFYNOL (registered Japanese trademark) 420", product of Nissin Chemical Industry Co., Ltd., content: ethylene oxide adduct of acetylene glycol, ionicity: nonionic, HLB value: 4, active component concentration: 100% by mass)

Rest: amount that makes the total mass of the components contained in a corresponding ink 100.0 parts by mass. For example, the rest of the ink (I-1) was 22.5 parts by mass (=100.0−(40.0+10.0+20.0+5.0+2.5)).

-: no corresponding component contained.

<Preparation of Ink (I-1)>

The components shown in the column titled "Ink (I-1)" in Table 3 were stirred using a stirrer (THREE-ONE MOTOR BL-600", product of Shinto Scientific Co., Ltd.). Thus, an ink (I-1) was obtained.

<Preparation of Ink (I-2)>

An ink (I-2) was prepared according to the same method as that for preparing the ink (I-1) in all aspects other than that the components shown in the column titled "Ink (I-2)" in Table 3 were stirred.

[Liquid Set Preparation]

Liquid sets (S-1) to (S-9), (S-10B) to (S-15B), and (S-16) were prepared. Tables 4 and 5 shows combinations of the cleaning liquids and the inks used for the respective liquid sets.

The cleaning liquids and the inks shown in the column titled "Liquid set" in Tables 4 and 5 were used in <Sample Plate Preparation>, <Measurement of Dried Ink-Cleaning liquid Contact Angle θd>, <Calculation of Contact Angle Difference θi−θc>, and [Evaluation of Cleanability], which will be described later. For example, the cleaning liquid (C-1) and the ink (I-1) were used for measurement and the like of the liquid set (S-1).

[Contact Angle Measurement]

Contact angle measurement was carried out using a contact angle measuring device ("OCA40", product of EKO Instruments B.V.) in an environment at 25° C. The SUS304 plate used was an SUS304 plate (product of OEM CO., LTD., thickness: 0.05 mm, length: 3 cm, width: 3 cm).

<Measurement of SUS-Ink Contact Angle θi>

With respect to each of the inks (I-1) and (I-2), a droplet of the ink was dropped onto the SUS304 plate. After one second has passed since the ink droplet landed on the SUS304 plate, the SUS-ink contact angle θi was measured using the contact angle measuring device.

<Measurement of SUS-Cleaning Liquid Contact Angle θc>

With respect to each of the cleaning liquids (C-1) to (C-9), (C10B) to (C-15B), a droplet of the cleaning liquid was dropped onto the SUS304 plate. After one second has passed since the droplet of the cleaning liquid landed on the SUS304 plate, the SUS-cleaning liquid contact angle θc was measured using the contact angle measuring device.

<Sample Plate Preparation>

A sample plate was prepared for use in measurement of the dried ink-cleaning liquid contact angle θd. First, the SUS304 was fixed on the stage of a spin coater ("1H-D3", product of Mikasa Co., Ltd.). Onto the central part of the SUS304 plate, 2 mL of the ink was dropped using a micropipette ("NICHIPET EX Plus II", product of NICHIRYO CO., LTD., 1000 μL to 5000 μL) with a tip ("IBIS PIPETTE TIP", available at AS ONE Corporation, 1000 μL to 5000 μL) mounted thereon.

Next, spin coating of the ink was carried out on the SUS304 plate using a spin coater. The conditions set for the spin coating were such that: the rotational speed of a stage of the spin coater was 2000 rpm; the rotation time was 3 seconds; and the film thickness of yet dried ink on the SUS304 plate was 7 μm directly after the spin coating.

Next, the ink on the SUS304 plate was dried at 60° C. using a horizontal oven ("EI-450B", available at AS ONE Corporation) until mass loss was no longer observed. Note that when the water and the organic solvent contained in the ink on the SUS304 plate evaporate and only a solid content contained in the ink remains, mass loss of the spin-coated SUS304 plate is no longer confirmed. Through the above, a sample plate was prepared. The sample plate was an SUS304 plate with film-like dried ink (dried ink film).

<Measurement of Dried Ink-Cleaning Liquid Contact Angle θd>

A droplet of the cleaning liquid was dropped onto the dried ink film on the sample plate prepared as above. After one second has passed since the droplet of the cleaning liquid landed on the dried ink film, the dried ink-cleaning liquid contact angle θd was measured using the contact angle measuring device.

<Calculation of Contact Angle Difference θi−θc>

From the SUS-ink contact angle θi and the SUS-cleaning liquid contact angle θc measured as above, a contact angle difference θi−θc was calculated using a formula "(contact angle difference θi−θc)=(SUS-ink contact angle θi)−(SUS-cleaning liquid contact angle θc)".

Tables 4 and 5 show the SUS-ink contact angles θi, the SUS-cleaning liquid contact angles θc, the dried ink-cleaning liquid contact angles θd measured as above and the contact angle differences θi−θc.

[Evaluation of Cleanability]

Onto the central part of the sample plate prepared above in <Sample Plate Preparation>, 0.3 mL of the cleaning liquid was dropped using a micropipette ("NICHIPET EX Plus II", product of NICHIRYO CO., LTD., 100 μL to 1000 μL) with a tip ("IBIS LONG TIP", available at AS ONE Corporation, 100 μL to 1000 μL) mounted thereon. Next, the sample plate was wiped using a rubber plate (material: ethylene propylene diene rubber (EPDM)) under conditions of a contact angle of the rubber plate with respect to the sample plate of 45 degrees, a movement speed of 100 mm/sec., and a penetration amount of 1.0 mm. Dripping and wiping of the cleaning liquid such as above was repeated 10 times.

After the tenth wiping, a microphotograph of the dried ink film on the sample plate was captured at a magnitude of 20× using a digital microscope ("VHX-7100", product of KEYENCE CORPORATION). In addition, binarization was carried out on the microphotograph using VHX-7100. Through the binarization, the microphotograph was divided into an ink film area where the dried ink film was present even after the wiping and a peeled area where the SUS304 plate was exposed due to the dried ink film having been peeled off by the wiping. Then, the area of the ink film area and the area of the peeled area were obtained. A removal rate (unit: %)

was obtained using an expression "removal rate=100×area of pee area/(area of ink film area+area of peel area)". Ink cleanability of the cleaning liquid was evaluated based on the removal rate according to the following criterial. The evaluation results are shown in Tables 4 and 5.
(Rating Criteria)
  A (very good): removal rate of 90% or more
  B (good): removal rate of at least 70% and less than 90%
  C (poor): removal rate of less than 70%

TABLE 4

| Example | 1 | 2 | 3 | 4 | 5 | 6 | 7 | 8 | 9 | 10 |
|---|---|---|---|---|---|---|---|---|---|---|
| Liquid set | S-1 | S-2 | S-3 | S-4 | S-5 | S-6 | S-7 | S-8 | S-9 | S-16 |
| Cleaning liquid | C-1 | C-2 | C-3 | C-4 | C-5 | C-6 | C-7 | C-8 | C-9 | C-8 |
| Ink | I-1 | I-1 | I-1 | I-1 | I-1 | I-1 | I-1 | I-1 | I-1 | I-2 |
| θc [degree] | 65 | 80 | 76 | 70 | 74 | 71 | 73 | 68 | 70 | 68 |
| θd [degree] | 2 | 15 | 10 | 5 | 7 | 11 | 14 | 4 | 3 | 7 |
| θi [degree] | 90 | 90 | 90 | 90 | 90 | 90 | 90 | 90 | 90 | 82 |
| θi − θc [degree] | 25 | 10 | 14 | 20 | 16 | 19 | 17 | 22 | 20 | 14 |
| Rating | A | B | B | A | A | B | B | A | A | B |

TABLE 5

| | Comparative Example | | | | | |
|---|---|---|---|---|---|---|
| | 1 | 2 | 3 | 4 | 5 | 6 |
| Liquid set | S-10B | S-11B | S-12B | S-13B | S-14B | S-15B |
| Cleaning liquid | C-10B | C-11B | C-12B | C-13B | C-14B | C-15B |
| Ink | I-1 | I-1 | I-1 | I-1 | I-1 | I-1 |
| θc [degree] | Unmeasurable | 91 | Unmeasurable | 85 | 93 | 130 |
| θd [degree] | Unmeasurable | 21 | Unmeasurable | 14 | 24 | 52 |
| θi [degree] | 90 | 90 | 90 | 90 | 90 | 90 |
| θi − θc [degree] | Unmeasurable | −1 | Unmeasurable | 5 | −3 | −40 |
| Rating | Unmeasurable | C | Unmeasurable | C | C | C |

In Tables 4 and 5, "Unmeasurable" indicates that it was impossible to accurately measure the physical property value or the evaluation value due to phase separation of the surfactant without dissolution in preparation of a corresponding cleaning liquid.

As shown in Table 2, the percentage content of the specific organic solvent of the cleaning liquid (C-10B) was greater than 18% by mass to the mass of the cleaning liquid. As a result, as shown in Table 5, the surfactant was phase-separated without dissolution in the preparation of the cleaning liquid (C-10B), leading to impossibility of evaluation of the cleaning liquid (C-10B).

As shown in Table 2, the percentage content of the acetylene surfactant in the cleaning liquid (C-11B) was less than 0.3% by mass to the mass of the cleaning liquid. As a result, cleanability of the cleaning liquid (C-11B) was evaluated as poor as shown in Table 5.

As shown in Table 2, the percentage content of the acetylene surfactant in the cleaning liquid (C-12B) was greater than 1.0% by mass to the mass of the cleaning liquid. As a result, the surfactant was phase-separated without dissolution in the preparation of the cleaning liquid (C-12B) as shown in Table 5, leading to impossibility of evaluation of the cleaning liquid (C-12B).

As shown in Table 2, the cleaning liquid (C-13B) contained an acrylic surfactant as the surfactant and did not contain an acetylene surfactant. The cleaning liquid (C-15B) neither contained an acetylene surfactant nor any other surfactants. As a result, the cleaning liquids (C-13B) and (C-15B) were evaluated as poor in cleanability as shown in Table 5.

As shown in Table 2, the cleaning liquid (C-14B) contained triethylene glycol monobutyl ether, which was not a specific organic solvent. As a result, the cleaning liquid (C-14B) was evaluated as poor in cleanability.

By contrast, each of the cleaning liquids (C-1) to (C-9) had the following features as shown in Table 1. That is, the cleaning liquid contained water, a specific organic solvent, and an acetylene surfactant. The specific organic solvent was at least one selected from the group consisting of polyhydric alcohol and polyalkylene glycol. The specific organic solvent had a percentage content of at least 1% by mass and no greater than 18% by mass to the mass of the cleaning liquid. The acetylene surfactant had a percentage content of at least 0.3% by mass and no greater than 1.0% by mass to the mass of the cleaning liquid. As a result, the cleaning liquids (C-1) to (C-9) were evaluated as good or very good in cleanability.

It is thought that the inks (I-1) and (I-2) have high adhesion to the specific recording medium due to containing a binder resin. Typically, an ink with high adhesion to the specific recording medium tends to cause cleaning failures. However, even when the inks (I-1) or (I-2) with high adhesion to the specific recording medium was used, the cleaning liquids (C-1) to (C-9) favorably cleaned the ink as shown in Table 4.

It was demonstrated from the above that the cleaning liquids (C-1) to (C-9) encompassed in the present disclosure can favorably clean the ink. It was also demonstrated that the liquid sets (S-1) to (S-9) and (S-16) encompassed in the present disclosure include an ink and a cleaning liquid that can favorably clean the ink.

What is claimed is:

1. An inkjet recording apparatus liquid set comprising:
  a first liquid; and
  a second liquid, wherein
  the first liquid is an ink and the second liquid is a cleaning liquid,
  the cleaning liquid contains water, a specific organic solvent, and an acetylene surfactant,
  the specific organic solvent is at least one selected from the group consisting of polyhydric alcohol and polyalkylene glycol,
  the specific organic solvent has a percentage content of at least 1% by mass and no greater than 18% by mass to mass of the cleaning liquid,
  the acetylene surfactant has a percentage content of at least 0.3% by mass and no greater than 1.0% by mass to the mass of the cleaning liquid, and
  a contact angle θi of the ink with respect to an austenitic stainless steel plate and a contact angle θc of the cleaning liquid with respect to the austenitic stainless steel plate satisfy a numerical formula (A):

$$\theta i - \theta c \geq 10 \quad (A).$$

2. The inkjet recording apparatus liquid set according to claim 1, wherein
  the ink has a contact angle θi with respect to an austenitic stainless steel plate of at least 75 degrees.

3. The inkjet recording apparatus liquid set according to claim 1, wherein
  the cleaning liquid has a contact angle θd with respect to the ink in a dried state of no greater than 15 degrees.

4. The inkjet recording apparatus liquid set according to claim 1, wherein the ink contains pigment particles, a resin, a water-soluble organic solvent, a surfactant, and water, the resin is urethane-acrylic resin, the water-soluble organic solvent includes glycerin, triethylene glycol monobutyl ether, and 2-pyrrolidone, and the surfactant is an acetylene surfactant.

5. An inkjet recording apparatus liquid set comprising:

a first liquid; and a second liquid, wherein the first liquid is an ink and the second liquid is a cleaning liquid, the cleaning liquid contains water, a specific organic solvent, and an acetylene surfactant, the specific organic solvent is at least one selected from the group consisting of polyhydric alcohol and polyalkylene glycol, the specific organic solvent has a percentage content of at least 1% by mass and no greater than 18% by mass to mass of the cleaning liquid, the acetylene surfactant has a percentage content of at least 0.3% by mass and no greater than 1.0% by mass to the mass of the cleaning liquid, and the cleaning liquid has a contact angle θd with respect to the ink in a dried state of no greater than 15 degrees.

6. The inkjet recording apparatus liquid set according to claim 5, wherein the ink has a contact angle θi with respect to an austenitic stainless steel plate of at least 75 degrees.

7. The inkjet recording apparatus liquid set according to claim 5, wherein a contact angle θi of the ink with respect to an austenitic stainless steel plate and a contact angle θc of the cleaning liquid with respect to the austenitic stainless steel plate satisfy a numerical formula (A):

$$\theta i - \theta c \geq 10 \tag{A}$$

8. The inkjet recording apparatus liquid set according to claim 5, wherein the ink contains pigment particles, a resin, a water-soluble organic solvent, a surfactant, and water, the resin is urethane-acrylic resin, the water-soluble organic solvent includes glycerin, triethylene glycol monobutyl ether, and 2-pyrrolidone, and the surfactant is an acetylene surfactant.

* * * * *